Dec. 19, 1961 — R. N. FALGE ET AL — 3,013,392
REMOTE CONTROL POSITIONING MECHANISM
Filed Feb. 28, 1957 — 2 Sheets-Sheet 1

INVENTORS.
Robert N. Falge &
BY Edward L. Barcus
R. F. Barnard
ATTORNEY.

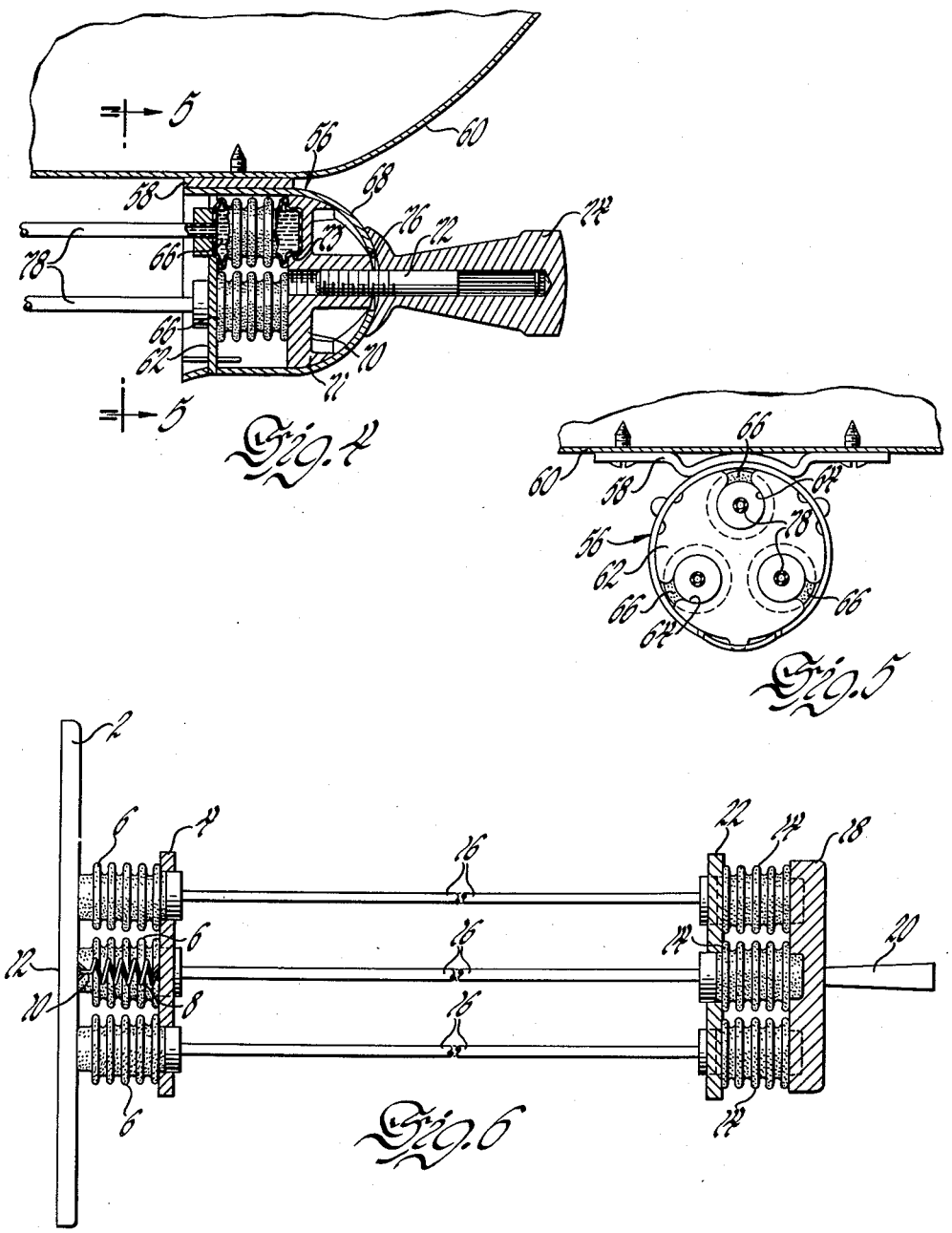

United States Patent Office 3,013,392
Patented Dec. 19, 1961

3,013,392
REMOTE CONTROL POSITIONING MECHANISM
Robert N. Falge and Edward L. Barcus, Anderson, Ind., assignors to General Motors Corporation, Detroit, Mich., a corporation of Delaware
Filed Feb. 28, 1957, Ser. No. 642,999
4 Claims. (Cl. 60—54.5)

The present invention relates to a fluid system for remotely controlling the position of a controlled member. More particularly, it relates to a remote control positioning mechanism in which the controlled member is maintained in the preselected position irrespective of changes in temperature or other atmospheric conditions which normally affect the fluid system.

Remote control positioning mechanisms have heretofore been suggested in which a controlled member is suitably mounted on a support for universal angular movement with respect thereto by means of a ball and socket joint or other rigid securing means. A plurality of fluid motors have been mounted on such a support to engage the controlled member, and have been connected by fluid circuits to corresponding controlling fluid motors which are manually selectively actuable by an operator whereby operation of the controlling fluid motors will result in corresponding actuation of the controlled fluid motors to selectively pivot the controlled member about its connection to its support.

One major disadvantage with such remote control fluid systems is that the fluid medium, which is usually a hydraulic fluid, is adversely affected by changes in temperature, pressure, and other atmospheric conditions. That is to say, due to changes in atmospheric conditions the hydraulic fluid may expand or contract causing the controlled member to move out of its preselected plane by tilting about its connection to the support thereof. Thus, if the controlled member is, for example, a rear view side mirror which is remotely operable from within a vehicle, the line of rear vision of the vehicle operator will be disrupted if the mirror moves out of its preselected plane.

Apart from the fact that such a condition disrupts a preselected position of the controlled member, it may be extremely dangerous where the controlled member is in turn connected to some other members which ultimately are to be controlled. For example, such a remote control mechanism may be advantageously employed on aircraft in which the controlled member is in turn connected to a plurality of devices, the relative position of which is to be maintained constant. Thus, several valves controlling fuel flow to various engines may be connected to the controlled member. When the controlled fluid motors react to changes in the fluid medium, the controlled member will move out of its preselected plane or angular position thereby changing the valve settings relative to each other.

It is contemplated to so mount a fluid motor actuated control member with respect to its support so that, upon contraction or expansion of the control fluid, the controlled member will be maintained in the preselected angular position or plane.

It is further contemplated within the scope of this invention to mount a controlled member to a support by resilient means which continuously loads or urges the controlled member into engagement with a plurality of fluid motors carried by the support, the points of connection of the fluid motors to the controlled member being symmetrically disposed about the connection of the latter with the resilient means.

Within the scope of this invention, a controlled member may be operatively connected to a support by means of a resilient spring which is connected to the controlled member substantially at the center of the latter, which spring constantly urges the controlled member against a plurality of fluid motors symmetrically spaced about the connection of the spring with the controlled member, whereby expansion or contraction of the various controlled fluid motors in response to changes in the fluid medium will maintain the controlled member in its preselected angular position or plane.

These and other advantages of the present invention will become more readily apparent as reference is made to the following description and drawings in which:

FIGURE 4 is an elevational cross section of the controlling component of the mechanism of FIGURE 1;

FIGURE 5 is a view taken on line 5—5 of FIGURE 4;

FIGURE 6 depicts the controlled and controlling components of the mechanism in its broader aspects apart from inclusion in a particular environment, the fluid motors being spaced as shown in FIGURES 3 and 5.

Figure 1:
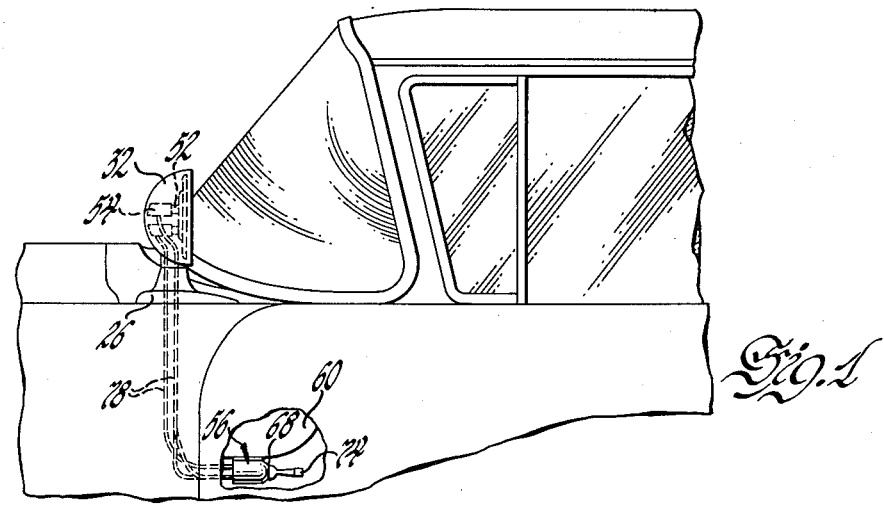
FIGURE 1 depicts the remote control positioning mechanism applied to a rear view side mirror attached to a vehicle.

Referring now to the drawings, and particularly FIGURE 6, there is shown a remote control positioning mechanism in which hydraulic fluid is preferably utilized as the controlling fluid medium, although it will be apparent that other fluids may also be used for this function. The remote control mechanism of this invention comprises a controlled member 2, a support 4 therefor, a plurality of fluid motors 6, herein disclosed as being bellows, and a resilient spring 8 fixedly secured to the support 4 and having an end 10 secured to controlled member 2 substantially at its midpoint 12 to constantly urge the controlled member against the fluid actuated bellows 6. A second group of bellows 14 are connected by individual sealed hydraulic circuits 16 with a corresponding controlled bellows 6. A controlling member 18 engages the controlling bellows 14 and has a handle 20 manually actuable to selectively variably actuate the bellows 14 relative to their support 22 to actuate the corresponding controlled bellows 6. It will be appreciated that the bellows 14 are suitably secured between the controlling member 18 and support 22.

As will appear more fully hereinafter, the three controlled bellows 6 are preferably angularly spaced 120 degrees apart and symmetrically disposed about the connection of the resilient spring 8 to the controlled member 2. The controlled member 2 is supported by the bellows 6, the spring 8 constantly urging it against the head of the respective bellows. Thus, the points of engagement of the bellows 6 with the controlled member form a triangle establishing the plane of the controlled member. However, as the controlled member is not fixedly secured to the support 4 but by a spring, the controlled member may shift axially relative to the support while remaining in the preselected plane or angular position. As will be apparent, changes in the condition of the hydraulic fluid will result in equal responses by the controlled bellows whereby the preselected angular position of the controlled member is preserved although it shifts axially relative to the support. Therefore, the controlled member is supported by a plurality of axially shiftable fulcrums, a resilient spring imposing a force on the controlled member which is so disposed relative to the fulcrums as to maintain the controlled member in a preselected plane, although the latter may shift axially with the fulcrums in response to changes in the fluid medium.

In operation, movement of the controlling member 18 will selectively actuate the three controlling bellows 14 which, in turn, will result in actuation of the corresponding controlled bellows 6 to position the controlled member 2 in any desired angular position or plane about the connection of the controlled member to the resilient spring 8. Thereafter, if a change in an atmospheric condition causes the hydraulic fluid to expand or contract, all three controlled bellows 6 will expand or contract to equal extents. Because of the spring connection, such an equal variation in the fluid motors or bellows 6 will cause the controlled member 2 to shift relative to the support 4, but in so shifting it will maintain its predetermined angular position or plane. Therefore, the disadvantage of previous mechanisms is avoided in which the controlled member was secured to the support so as to preclude such shifting movement, thereby resulting in tilting of the controlled member about its connection to the support in response to a change in atmospheric conditions.

It may therefore be seen that the outer periphery of the controlled member 2 may be connected through suitable linkages to a plurality of devices, and that the effect of atmospheric conditions on the hydraulic fluid will result in actuation of these linkages to the same extent thereby maintaining the same relative position between the devices.

Figure 2:
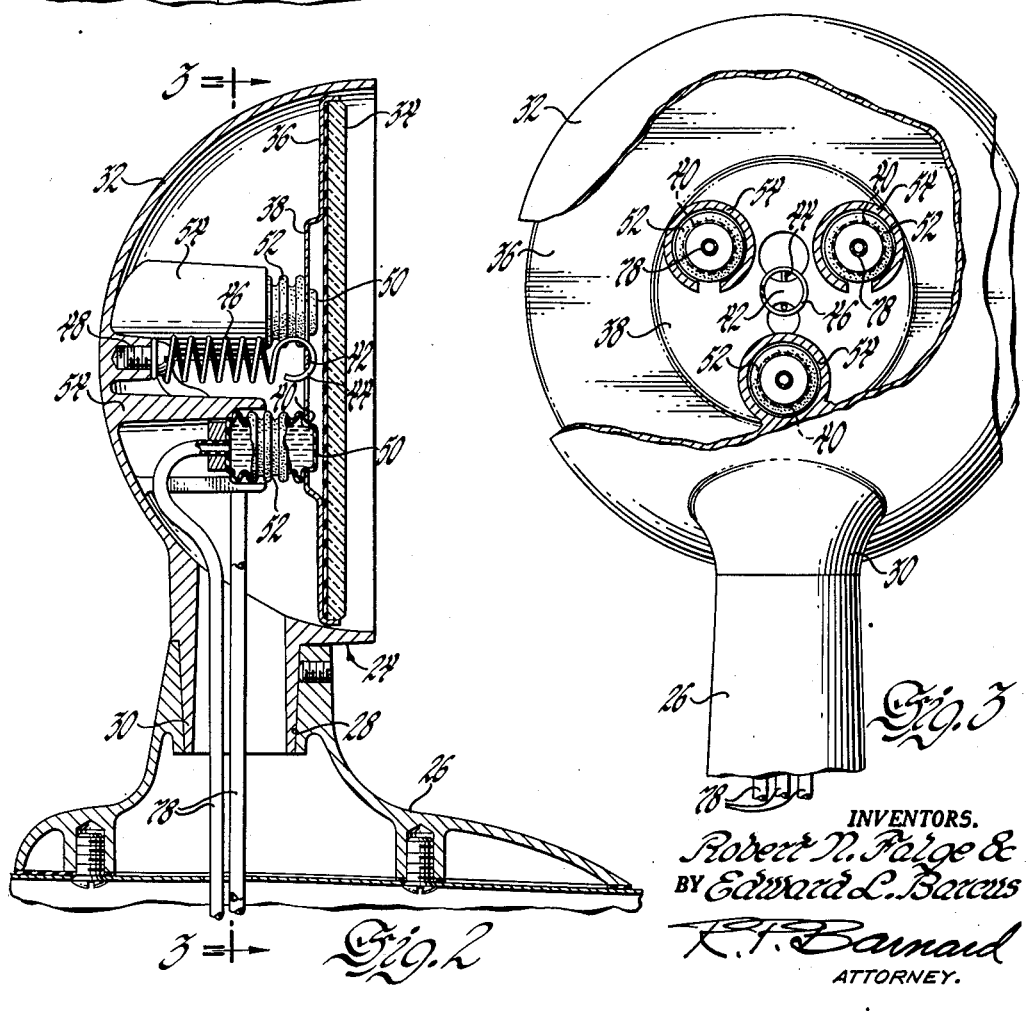
FIGURE 2 is an elevational cross section of the rear view mirror.
Figure 3:
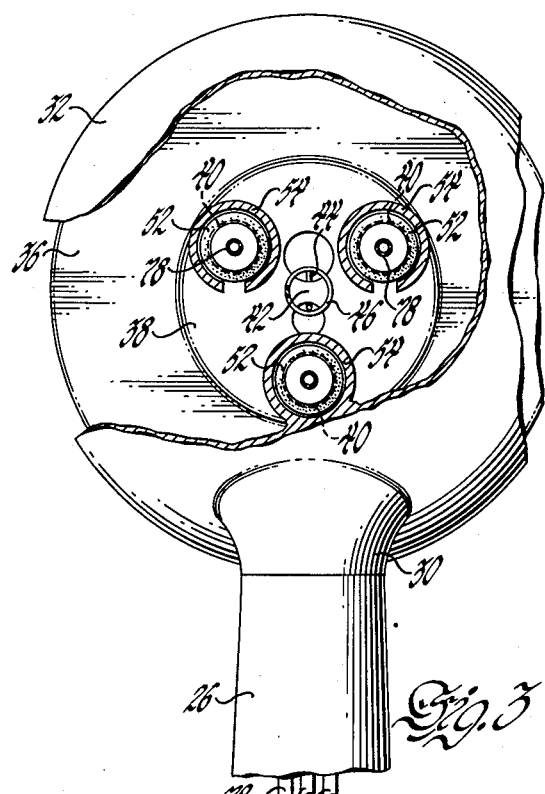
FIGURE 3 is a cross section, partly broken away, taken on line 3—3 of FIGURE 2.

Another use of such a remote controlled mechanism has been shown in conjunction with a hydraulically actuated rear view mirror adapted to be carried externally of a vehicle. In this illustration, as shown in FIGURES 1 to 5, there is disclosed a support 24 composed of a hollow lower bracket 26 adapted to be suitably secured to a vehicle panel, and having a bore 28 receiving the neck 30 of a shell-like housing 32 for a rear view mirror assembly. The mirror assembly is radially spaced from housing 32 and comprises a conventional circular reflecting surface 34 suitably seated in a mounting bracket 36 having an axially rearwardly spaced circular central portion 38. The central bracket portion 38 has three apertures 40 angularly spaced from each other by 120 degrees and symmetrically disposed about the mid-point 42 of the mirror mounting bracket which is engaged by the looped end 44 of a spring 46 fixedly secured to the housing 32 by a stud 48 to continuously urge the mirror assembly or controlled member against the heads 50 of three bellows 52 seated in the symmetrically spaced apertures 40. The bellows are anchored and supported within cylindrical housings 54 extending axially toward the mirror assembly from the housing 32.

A cylindrical support 56 is mounted by means of a bracket 58 beneath the instrument panel 60 of a vehicle. The support 56 includes a panel or stabilizing plate 62 which has three preferably symmetrically spaced apertures or seats 64 to receive and support the ends of the controlling bellows 66. Mounted within the spherical head 68 of the support 56 is a controlling member or wobble plate 70 having a peripheral edge 71 of spherical contour for slideable disposition within the spherical head 68 of the support. The wobble plate or controlling member 70 has three depressions 73 suitably spaced to correspond to the seats 64 in stabilizing plate 62 so as to receive and support the other ends of the bellows 66. A securing stud 72 extends between a bore centrally disposed within the wobble plate 70 and a bore within a manually actuable handle 74, whereby the operator may selectively actuate the controlling bellows 66. The surface of the handle 74 engaging the spherical head 68 of support 56 is also spherically contoured for slideable engagement with head 68 as will be apparent from FIGURE 4. The edges of an aperture 76 in the spherical head 68 through which the stud 72 extends may be so proportioned as to limit the degree of actuation of the bellows by engagement with the stud 72. Each of the bellows 66 is connected to a corresponding controlled bellows 52 by a fluid line 78 which extends through the hollow mirror support 24. In its preferred form, each circuit comprising a controlled bellows 52, a controlling bellows 66 and the fluid line 78 therebetween is permanently sealed to form a closed fluid circuit.

The operation of remotely controlling the position of the mirror assembly or controlled member is the same as that previously described. Actuation of the wobble plate 70 collapses and expands selected ones of the controlling bellows 66 resulting in a fluid transfer between these bellows and their respective controlled bellows 52 to tilt the mirror assembly into a desired plane or angular position. As changes in atmospheric conditions, and temperatures particularly, occur the expansion or contraction of the hydraulic medium will equally affect the controlled bellows, thereby causing the spring loaded mirror assembly to maintain its preselected plane while shifting axially either toward or away from the housing 32.

We claim:

1. A mechanism for remotely controlling the angular position of a controlled member comprising a support, a plurality of fluid motors carried by said support, a controlled member, yieldable means engaging said member to urge the latter into engagement with said motors, said member being angularly adjustable about its point of engagement with said yieldable means in response to operation of said motors, and pump means located remotely from and connected to said motors, said pump means being actuable to operate said motors to position said member angularly relative to said support.

2. A mechanism for remotely controlling the angular position of a controlled member comprising a support, a plurality of fluid motors carried by said support, a controlled member, yieldable means urging said member into engagement with said motors to support said member on said motors, said member being angularly adjustable about its point of engagement with said yieldable means in response to operation of said motors, and pump means located remotely from and connected to said motors, said pump means being actuable to operate said motors to position said member angularly relative to said support.

3. A mechanism for remotely controlling the angular position of a controlled member comprising a support, a plurality of fluid motors carried by said support, a controlled member, spring means mounted on said support and connected to said member to urge the latter into engagement with said motors to support said member on said motors, said member being angularly adjustable about its connection to said spring means in response to operation of said motors, said motors being symmetrically disposed about said spring means, and pump means located remotely from and connected to said motors, said pump means being actuable to operate said motors to position said member angularly relative to said support.

4. A mechanism for remotely controlling the angular position of a controlled member comprising a fixed support, a plurality of spaced fluid motors mounted in parallel relationship on said support, each of said motors axially extensible and contractable relative to said support, a controlled member, spring means connected between said support and member to urged spaced points on the latter axially into engagement with said motors to support said member on said motors, said spaced points on said member being equidistantly located from the point of connection of said member to said spring means, said member being angularly adjustable about its point of connection with said spring means in response to operation of said motors, a plurality of pump means located remotely from said motors, fluid circuit means connecting a respective one of said motors to a respective one of said pump means whereby actuation of said pump means actuates said motors to position said member in a selected plane relative to said support, and means for actuating said pump means.

References Cited in the file of this patent

UNITED STATES PATENTS

| | | |
|---|---|---|
| 1,542,259 | Macy | June 16, 1925 |
| 1,931,952 | Charles | Oct. 24, 1933 |
| 2,198,965 | Habig et al. | Apr. 30, 1940 |
| 2,281,234 | Clarke et al. | Apr. 28, 1942 |
| 2,297,610 | De Giers | Sept. 29, 1942 |
| 2,373,745 | Conway | Apr. 17, 1945 |
| 2,419,999 | Leck | May 6, 1947 |
| 2,534,495 | Younghusband | Dec. 19, 1950 |
| 2,545,258 | Cailloux | Mar. 13, 1951 |
| 2,614,437 | Meggitt | Oct. 21, 1952 |
| 2,626,539 | Peterson | Jan. 27, 1953 |
| 2,656,764 | Johnson | Oct. 27, 1953 |
| 2,696,142 | Langford | Dec. 7, 1954 |
| 2,800,055 | May | July 23, 1957 |
| 2,855,825 | Feder | Oct. 14, 1958 |

UNITED STATES PATENT OFFICE

CERTIFICATION OF CORRECTION

Patent No. 3,013,392                            December 19, 1961

Robert N. Falge et al.

It is hereby certified that error appears in the above numbered patent requiring correction and that the said Letters Patent should read as corrected below.

Column 2, line 21, for "aspects" read -- aspect --; column 4, line 62, for "urged" read -- urge --.

Signed and sealed this 24th day of April 1962.

(SEAL)
Attest:

ESTON G. JOHNSON                            DAVID L. LADD
Attesting Officer                              Commissioner of Patents